United States Patent
Lee et al.

(10) Patent No.: US 8,512,054 B2
(45) Date of Patent: Aug. 20, 2013

(54) AUTOMOTIVE BATTERY PLUG WITH RETRACTABLE CONDUCTION SECTIONS

(75) Inventors: Yu-Lung Lee, Miaoli County (TW); Ming-Chou Kuo, Taipei (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 415 days.

(21) Appl. No.: 12/837,711

(22) Filed: Jul. 16, 2010

(65) Prior Publication Data

US 2011/0254500 A1   Oct. 20, 2011

(30) Foreign Application Priority Data

Apr. 19, 2010   (TW) ................. 99207048 U

(51) Int. Cl.
*H01R 13/60* (2006.01)
*H02J 7/00* (2006.01)

(52) U.S. Cl.
USPC .......................................... 439/131; 320/107

(58) Field of Classification Search
USPC .......................... 320/107; 439/131, 172, 668
See application file for complete search history.

(56) References Cited

U.S. PATENT DOCUMENTS

| | | | | |
|---|---|---|---|---|
| 5,230,641 | A * | 7/1993 | Wharton | 439/668 |
| 6,135,798 | A * | 10/2000 | Saruta et al. | 439/259 |
| 6,551,142 | B2 * | 4/2003 | Eisenbraun | 439/668 |
| 6,641,405 | B2 * | 11/2003 | Chou | 439/32 |
| 6,902,437 | B1 * | 6/2005 | Wang | 439/668 |
| 7,175,474 | B1 * | 2/2007 | Chang et al. | 439/501 |
| 2010/0295504 | A1 * | 11/2010 | Lin | 320/107 |

* cited by examiner

*Primary Examiner* — Richard V Muralidar
(74) *Attorney, Agent, or Firm* — Rosenberg, Klein & Lee

(57) ABSTRACT

A car charger which has a charge circuit, a shell, an anode conduction section, a cathode conduction section, an operation section, and a connection interface is disclosed. The operation section may selectively collect the anode and cathode conduction sections within a container space of the shell by the manner selected from folding and rotating. Thus, convenience of carrying the car charger may be improved.

9 Claims, 12 Drawing Sheets

AUTOMOTIVE BATTERY PLUG WITH RETRACTABLE CONDUCTION SECTIONS

BACKGROUND OF THE INVENTION

1. Field of the Invention

The present invention relates to a car charger, especially to a car charger which is easy to carry.

2. Description of Related Art

Along with the progression of the technologies, there are numerous of portable electronic devices, such as a mobile phone, a personal digital assistant, a digital camera, and a notebook computer, for providing real-time information processing capabilities to users. The portable electronic devices usually have embedded batteries for providing requisite electric power. If the electric power of the embedded battery is exhausted, a charger is required for charging the battery.

Because the portable electronic devices are for outdoor using, so the selections of source of electric power are deficient. For users, the power supply of the vehicle is one of the selections to acquire electric power.

Generally, there is a cigarette lighter nearby the driver's seat, for lighting cigarettes. Nowadays, the cigarette lighter may also used for charging electronic devices through a car charger. That is, the car charger acquires electrical power from the power supply of the vehicle through the cigarette lighter.

For obtaining requisite power from the power source of the vehicle, the users must carry the car chargers along with the electronic devices. However, conventional car chargers are not light and handy enough for carrying by users.

SUMMARY OF THE INVENTION

Because of the aforementioned problems, the present invention provides a car charger which is easy to carry. The car charger may selectively collect an anode conduction section and a cathode conduction section within a shell of the car charger. Therefore, the practical value and the convenience when using the car charger may be improved.

For achieving the mentioned purposes, a car charger is provided according to the present invention. The car charger is for capturing electric power of a power source of a vehicle, and for providing electric power to an electronic device. The car charger includes a shell, a charge circuit, an anode conduction section, a cathode conduction section, an operation section, and a connection interface. Wherein the shell has a container space, and the charge circuit is set with the shell, for capturing electric power from the power source and providing requisite power to the electronic device.

The anode conduction section is electrically connected to the charge circuit, and is set at an end of the shell. The cathode conduction section is also electrically connected with the charge circuit, and is set at side of the shell. The operation section is connected to the anode conduction section and the cathode conduction section, for selectively collecting the anode and cathode conduction sections within the container space of the shell. The connection interface is electrically connected to the charge circuit and set with the shell, for connecting with the electronic device.

In which, the operation section may include a carrying base and a slide positioning component. The carrying base is placed in the shell for carrying the anode conduction section, and has a support section which is connected to the cathode conduction section. The slide positioning component is connected to the carrying base, for fixing the position of the carrying base by corresponding to at least one slide positioning slot. Thus, the slide positioning component may used to lead the carrying base for selectively collecting the anode conduction section and the cathode conduction section within the container space of the shell.

Alternatively, the operation section may include a carrying base, a rotation positioning component, and an elastic component. The carrying base is placed in the shell for carrying the anode conduction section, and may further have a support section and a pushing slice, in which the support section is connected to the cathode conduction section. The rotation positioning component is connected to the shell. The elastic component is connected to the carrying base and is corresponded to a blocking slice of the shell. Wherein the rotation positioning component rotates along with the shell, and leads the pushing slice for making the carrying base to slice, in order to electively collect the anode and cathode conduction section within the container space.

According to another scheme of the present invention, the operation section of the car charger may include a rotation component and a slide piece. The rotation component is set with the shell, and the surface of the rotation component has at least one spiral thread. The slide piece is connected to the cathode conduction section, and has at least one dimpled grain corresponding to the spiral thread. Wherein the rotation component rotates along with the shell for selectively collecting the cathode conduction section within the container space.

By setting up an operation section with the car charger, the anode and cathode conduction section may be selectively collected within the car charger. Therefore, the practical value and the convenience of carrying the car charger may be improved.

For further understanding of the invention, reference is made to the following detailed description illustrating the embodiments and examples of the invention. The description is only for illustrating the invention, not for limiting the scope of the claim.

BRIEF DESCRIPTION OF THE DRAWINGS

The drawings included herein provide further understanding of the invention. A brief introduction of the drawings is as follows.

DETAILED DESCRIPTION OF THE PREFERRED EMBODIMENTS

Figure 1A:
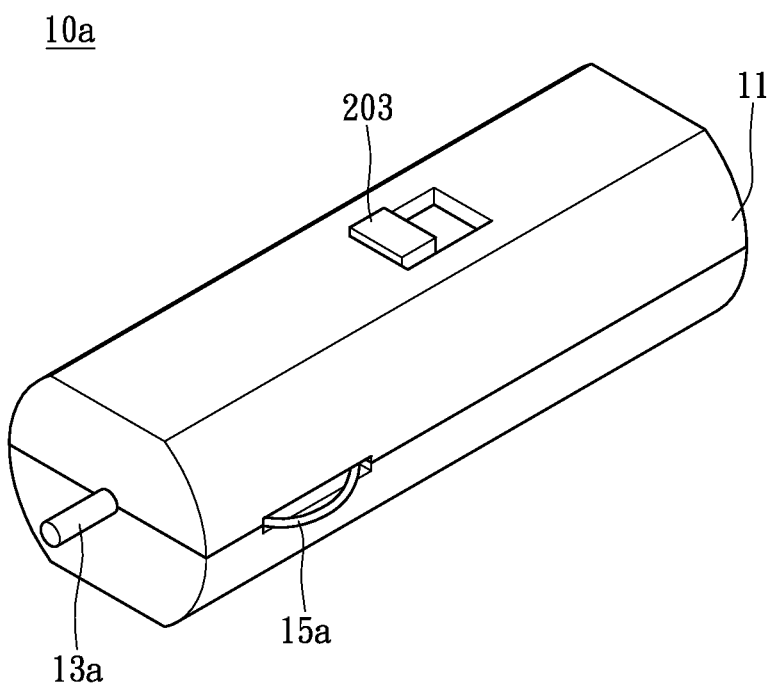
FIG. 1A is an outward structural diagram of a car charger when the conduction sections are not collected within the car charger according to an embodiment of the present invention.
Figure 1B:
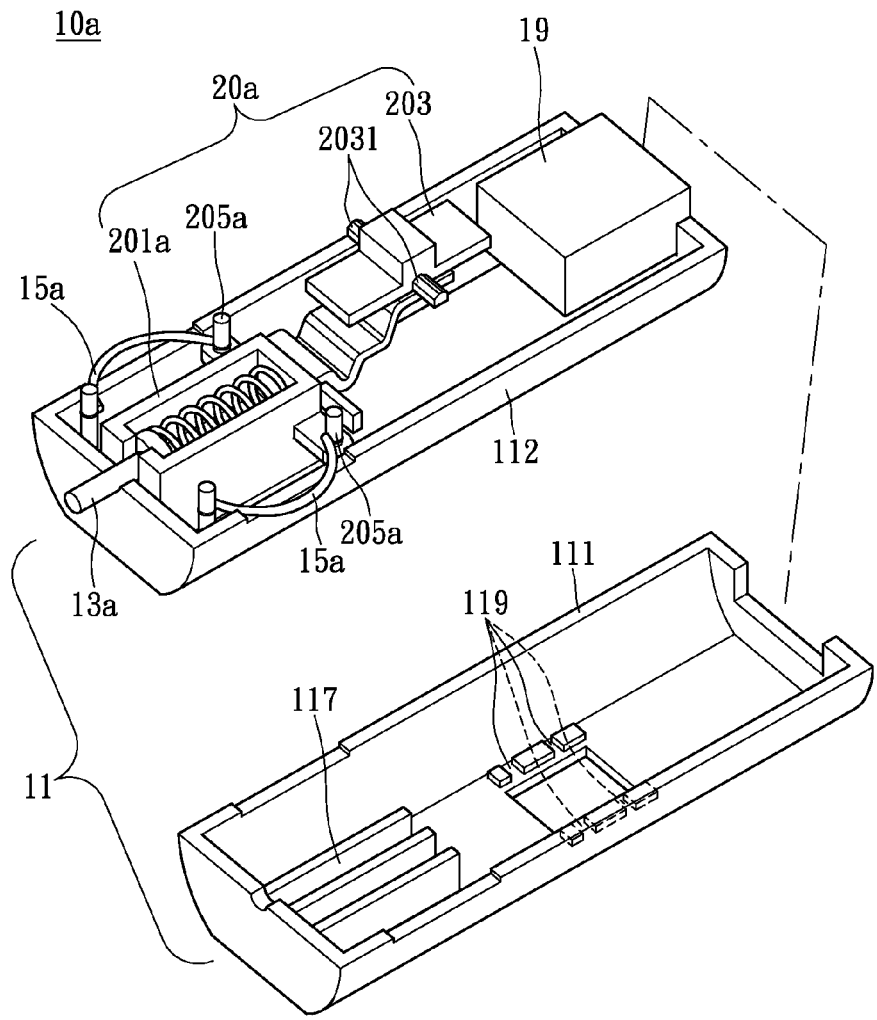
FIG. 1B is an inner structural diagram of the car charger when the conduction sections are not collected within the car charger according to the embodiment of the present invention.

Please refer to FIG. 1A and 1B, which are outward and inner structural diagrams of the car charger 10a respectively according to one embodiment of the present invention. The car charger 10a has a shell 11, a charge circuit (not shown), an anode conduction section 13a, a pair of cathode conduction sections 15a, and an operation section 20a. In FIG. 1B, the anode conduction section 13a is placed in a carrying base 201a of the operation section 15a. The cathode conduction sections 15a is set at two sides of the carrying base 201a. One end of the shell 11 has an aperture for the anode conduction section 13a to stick out, and the shell 11 also has strip shape holes for the cathode conduction sections 15a to reach out. Thus, the anode conduction section 13a and the cathode conduction sections 15a may connect to the cigarette lighter of a vehicle, so as to capturing electric power from the power source of the vehicle, for providing requisite power to an electronic device. Each cathode conduction section 15a has two ends fixed to the front end of the shell 11 and the rear end of the carrying base 20 respectively.

The charge circuit is the power supply module of the car charger 10a, for regulating and transforming the electric power captured from the vehicle, and for providing electric power to the electronic device. The shell 11 is the housing of the car charger 10a, in which the shell 11 has spaces for containing the charge circuit, by doing so, the charge circuit may be protected from outward influences, so the stability of the charge circuit may be improved. The shell 11 may further include a container space for collecting the anode conduction section 13a and the cathode conduction sections 15a.

In this embodiment, the anode conduction section 13a is set at the end of the shell 11 of the car charger 10a, and is electrically connected to the charge circuit. The shape of the anode conduction section 13a may be any kind of shapes for fitting in with the cigarette lighter of the vehicle, and the anode conduction section 13a may be made of conductive materials for capturing electric power. The cathode conduction sections 15a are set at two sides of the shell 11, for connecting to the conductive sections of the cigarette lighter of the vehicle. The cathode conduction sections 15a may be made of conductive materials, and may be elastic strips or slices.

As shown in FIG. 1B, the operation section 20a of this embodiment may include a carrying base 201a and a slide positioning component 203 disposed in the spaces formed by a first shell 111 and a second shell 112. The carrying base 201a is for carrying the anode conduction section 13a, so the anode conduction section 13a may not move irregularly. The carrying base 20a further includes a support section 205a which is connected to one end of the cathode conduction sections 15a. The other end of the cathode conduction sections 15a is fixed on a rod (not labeled) formed at the front end of the shell 11, that is in the first shell 111, and the rod is formed in the formed in the first shell 111. The slide positioning component 203 is connected to the carrying base 201a. In this embodiment, the sides of the slide positioning component 203 may have side bars 2031 corresponding to a plurality of slide positioning slots 119 of the shell 11.

Part of the slide positioning component 203 reaches out of the shell 11, thus the users may push the slide positioning component 203 for making the side bars 2031 move between the slide positioning slots 119 of the shell 11, in order to move the carrying base 201a. When the carrying base 201a moving, the anode conduction section 13a moves along with the carrying base 201a, and the cathode conduction sections 15a is stretched or bended by the support sections 205a. Thus, the anode conduction section 13a and the cathode conduction sections 15a may be selectively collected within the container space of the shell 11.

Additionally, the shell 11 may include at least one rib 117, for fixing the position of the carrying base 201a of the operation section 20a, so that the carrying base 201a may not move unexpectedly. The car charger 10a may further include a connection interface 19 which may be a universal serial bus (USB) connection interface, for connecting to the electronic device.

Figure 2A:
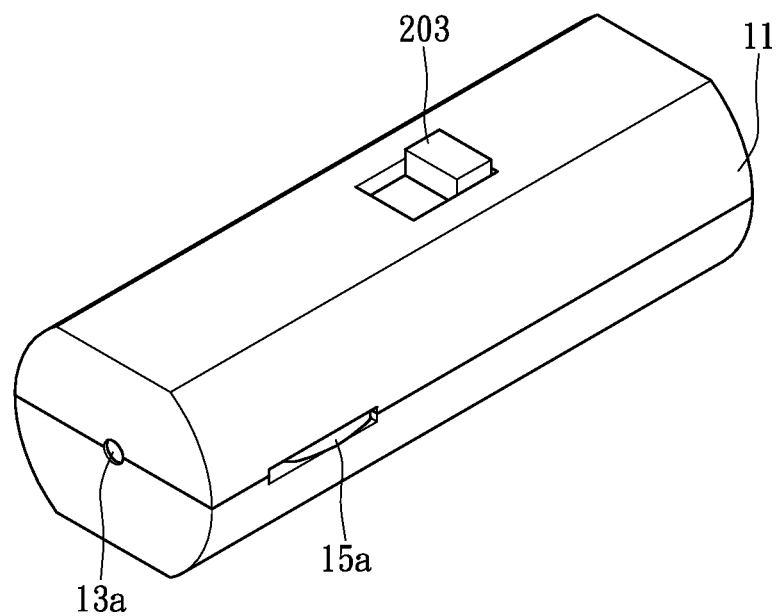
FIG. 2A is an outward structural diagram of the car charger when the conduction sections are collected within the car charger according to the embodiment of the present invention.
Figure 2B:
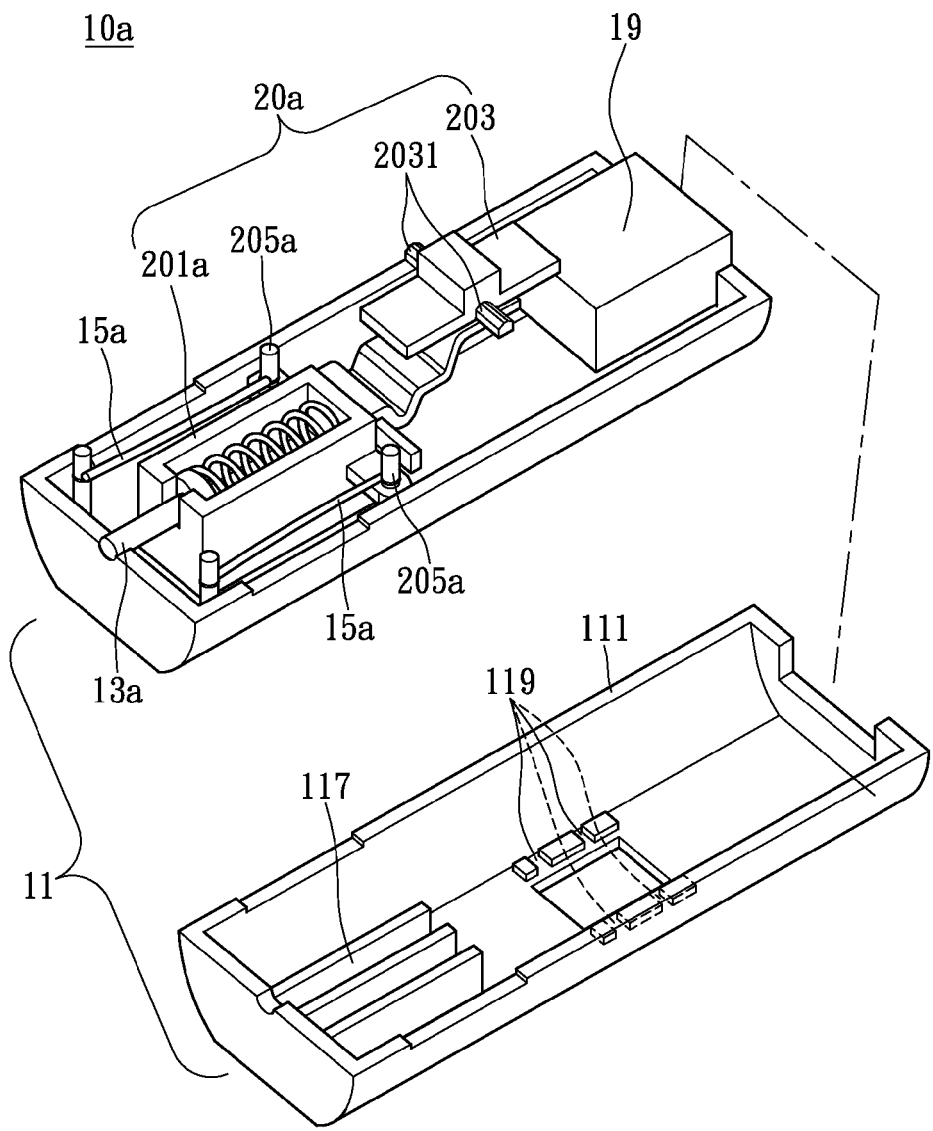
FIG. 2B is an inner structural diagram of the car charger when the conduction sections are collected within the car charger according to the embodiment of the present invention.

Please refer to FIG. 2A and 2B, which are outward and inner structural diagrams of the car charger when the conduction sections are collected according to the embodiment of the present invention. As shown in the figures, because the carrying base 201a may be moved by users, so the anode conduction section 13a may be selectively collected within the shell 11, and the cathode conduction sections 15a may be stretched and collected within the shell 11.

Figure 3:
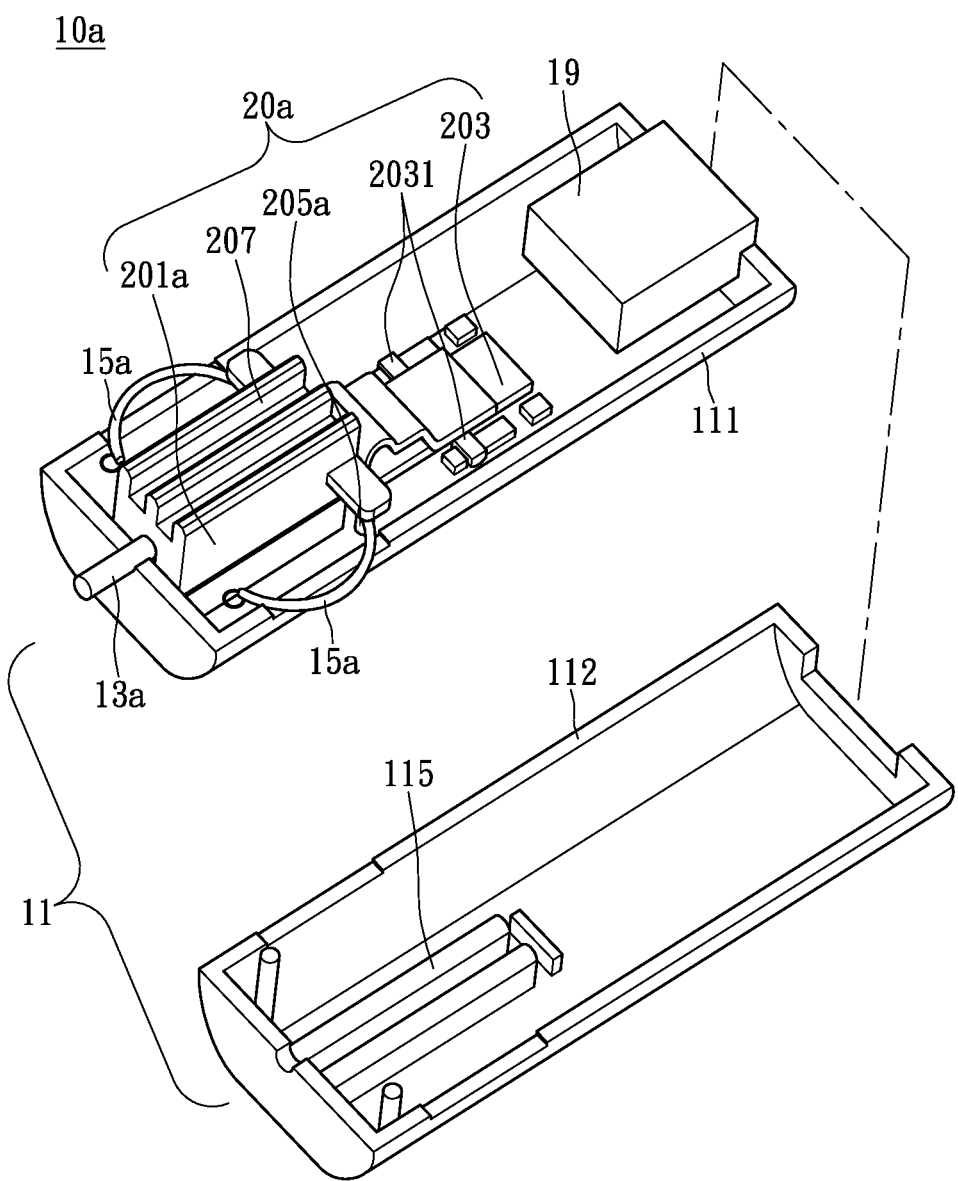
FIG. 3 is a structural diagram of an operation section of the car charger according to the embodiment of the present invention.

Additionally, as shown in FIG. 3 which is a structural diagram of the operation section 20a of the embodiment, the carrying base 201 may have at least one slide slice 207 corresponding to at least one slide track 115 of the second shell 112. According to the slide slices 207 and the slide tracks 115, the carrying base 201a may be moved in a predetermined direction. Furthermore, one end of the cathode conduction section 15a may be fixed at the shell 11, or be fixed at a bump setting at the shell 11, for avoiding poor electrical contact induced by irregular positions of the cathode conduction sections 15a.

Figure 4A:
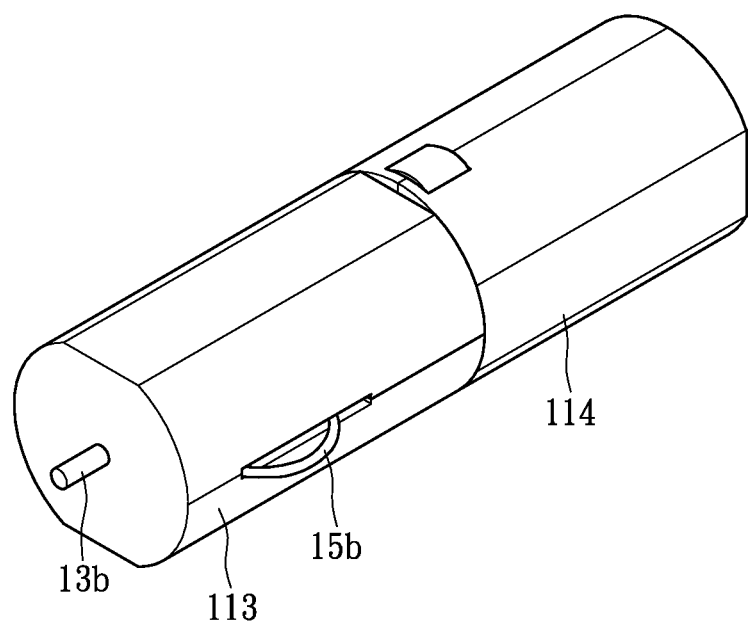
FIG. 4A is an outward structural diagram of a car charger when the conduction sections are not collected within the car charger according to another embodiment of the present invention.
Figure 4B:
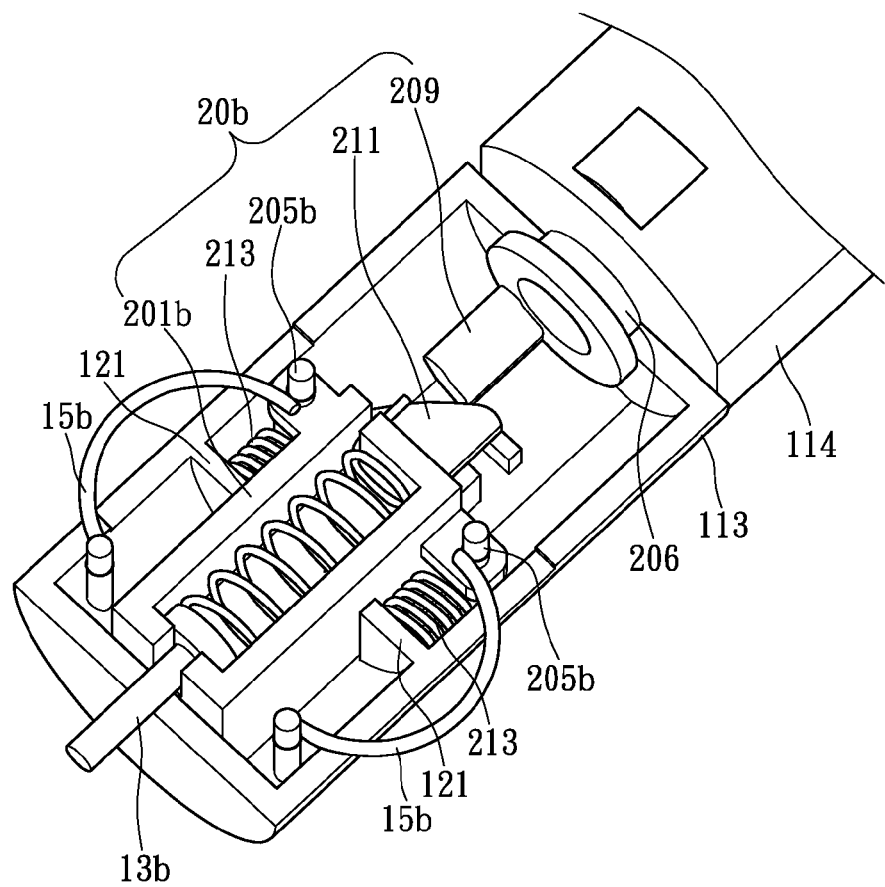
FIG. 4B is an inner structural diagram of the car charger when the conduction sections are not collected within the car charger according to the embodiment of the present invention.

Please refer to FIG. 4A and 4B, which are outward and inner structural diagrams respectively of the car charger 10b according to another embodiment of the present invention. The car charger 10b includes a third shell 113, a fourth shell 114, an anode conduction section 13b, cathode conduction sections 15b, a charge circuit (not shown), and an operation section 20b.

Figure 5A:
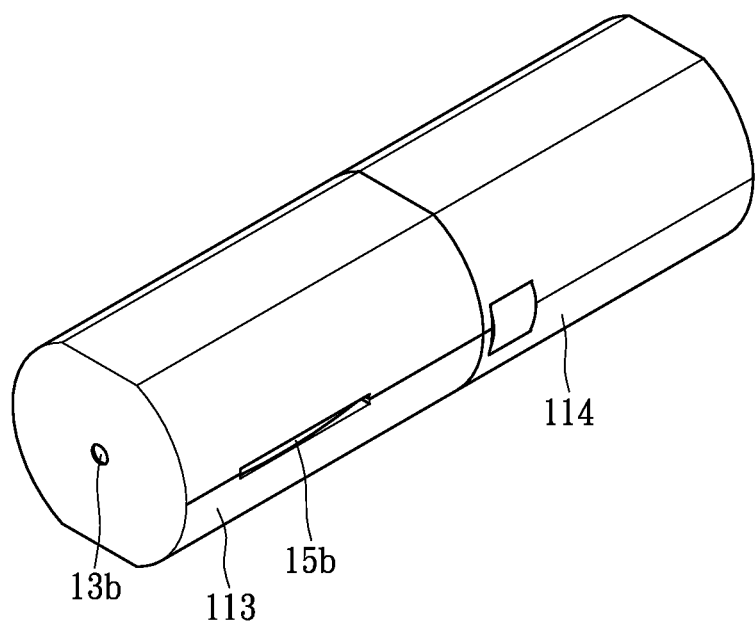
FIG. 5A is an outward structural diagram of the car charger when the conduction sections are collected within the car charger according to the embodiment of the present invention.
Figure 5B:
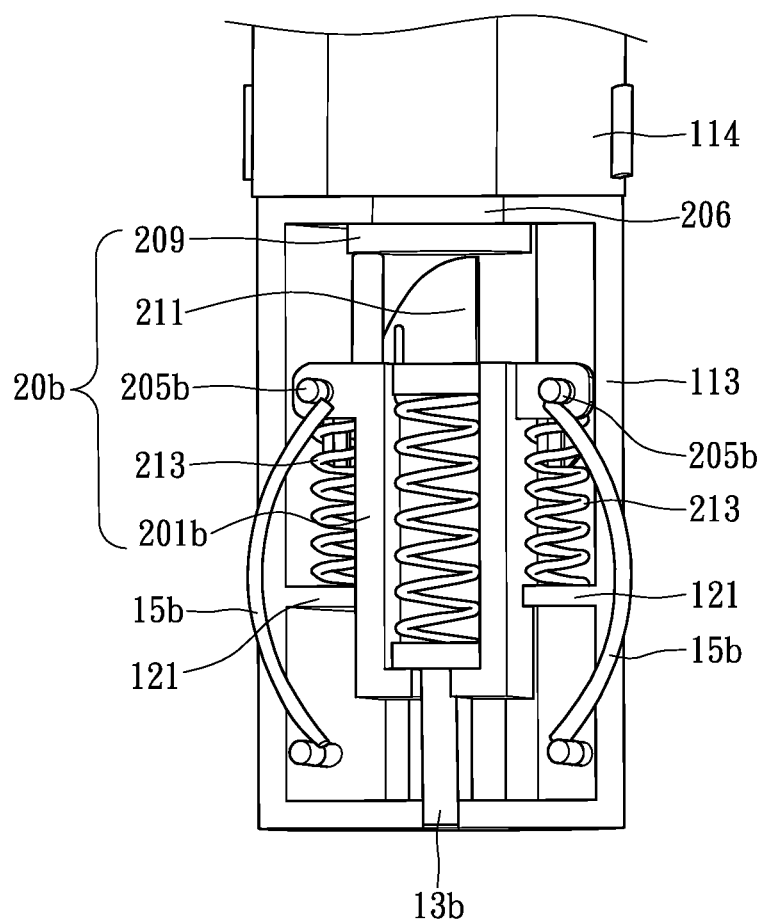
FIG. 5B is an inner structural diagram of the car charger when the conduction sections are collected within the car charger according to the embodiment of the present invention.

In FIG. 4B, the operation section 20b has a carrying base 201b, a rotation hinge 206, and a rotation positioning component 209. The rotation hinge 206 and the rotation positioning component 209 can be deemed a rotating switch. The rotation hinge 206 is rotatably mounted on the rear end of the shell 11, and the rotation positioning component 209 is connected to the rotation hinge 206 and extended into the shell 11. Wherein the carrying base 201b is movably disposed in the shell 11 and the anode conduction section 13b is received in the carrying base 201b. The carrying base 201b further includes a pair of support sections 205b formed on the rear end thereof, and the support sections 205b are connected to one end of the cathode conduction sections 15b. The rotation positioning component 209 is connected with the rotation hinge 206 of the fourth shell 114. When the fourth shell 114 is rotated along an axial direction by users, the rotation positioning component 209 may also be rotated and pushes a pushing slice 211 of the carrying base 201b. The rotating switch is rotatably mounted to the rear end of the shell 11 to push the pushing slice 211 of the carrying base 201b between a forward position corresponding to FIG. 4B and a backward position corresponding to FIG. 5B. As shown in FIGS. 4B and 5B, the pushing slice 211 has an inclined plane to contact the rotation positioning component 209. Thus, the carrying base 201b may slide and make the anode conduction section 13b to move and the cathode conduction sections 15b to stretch or bend.

In FIG. 4A and 4B, the anode conduction section 13b and the cathode conduction sections 15b are reaching outside the shell 11. When the user rotates the fourth shell 114 along the axial direction, as shown in FIG. 5A and 5B, a pair of elastic components 213 is disposed in the shell 11 and beside the carrying base 201b and may push the carrying base 201b far away the front end of the shell. The elastic component 213 has one end by contacting contacted the blocking slices 121 of the third shell 113 and the other end contacted a rear part of the carrying base 201b for pushing the carrying base 201b from the forward position to the backward position, so that the anode conduction section 13b can be pulled inside the shell 11 and the cathode conduction sections 15b can be stretched within the car charger 10b. As shown in FIG. 4B, which corresponds to the forward position of the carrying base 201b, the anode conduction section 13b is protruded outside the front end of the shell 11, and the cathode conduction sections 15b are protruded outside the shell 11. As shown in FIG. 5B, which corresponds to the backward position of the carrying base 201b, the anode conduction section 13b is retracted in the shell 11, and the cathode conduction sections 15b are stretched by the elastic component 213 and received in the shell 11.

Figure 4C:
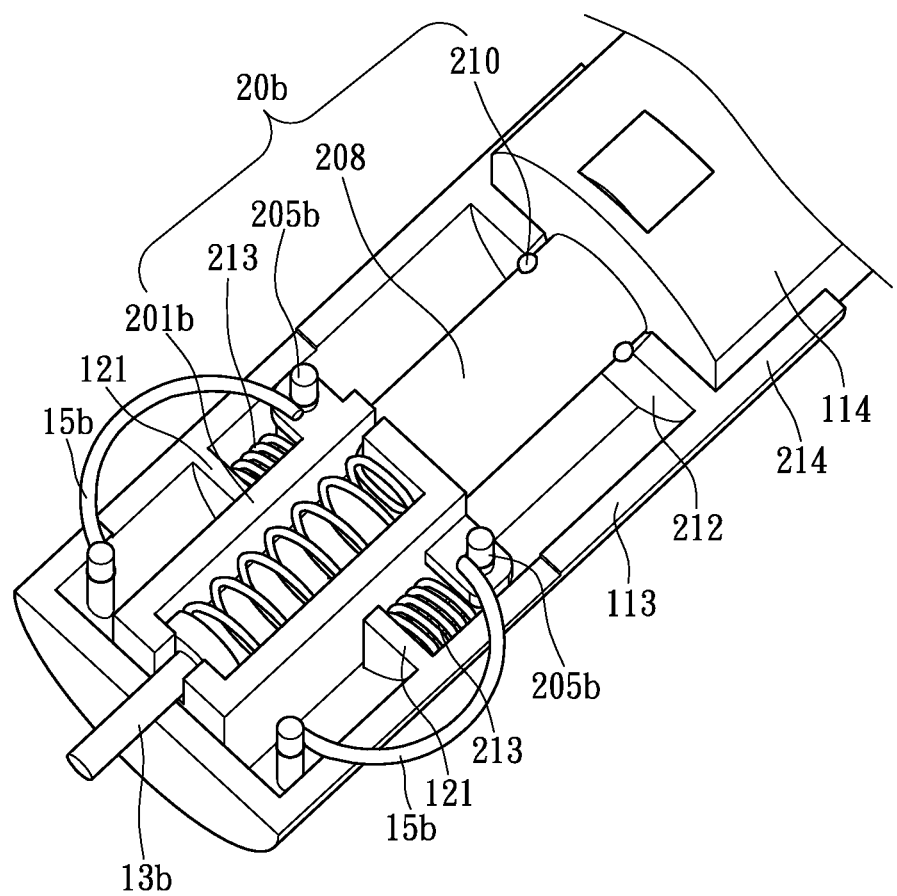
FIG. 4C is an inner structural diagram of the car charger when the conduction sections are not collected within the car charger according to another embodiment of the present invention.

Alternatively, as shown in FIG. 4C, the operation section 20b be implemented as a carrying base 201b, a connecting component 208, and at least one cross point 210. The carrying base 201b is connected with the fourth shell 114, which is the rear part of the shell 11, by the connection component 208. The connection component 208 and the fourth shell 114 can be deemed a rotating switch, which is rotatably mounted to the cross board 201b of the shell. The connection component 208 is extended into the container space of the shell 11 and contacted with the rear end of the carrying base 201b. The carrying base 201b has a cross board 212 (or called as cross slice) formed at the rear end thereof. The cross point 210 is formed on the surface of the connection component 208 corresponding to the cross slice 212 of the third shell 113. When user uses the car charger 10b, the third shell 113 may be shifted toward the fourth shell 114, so that the cross point 210 is blocked by the cross slice 212 for keeping the anode conduction section 13b and the cathode conduction section 15b reaching outside the third shell 113. In other words, when the cross point 210 is selectively blocked by the cross board 212 in the shell, the anode conduction section 13b is protruded outside the front end of the shell 11, and the cathode conduction section 15b is protruded outside the shell 11.

Figure 5C:
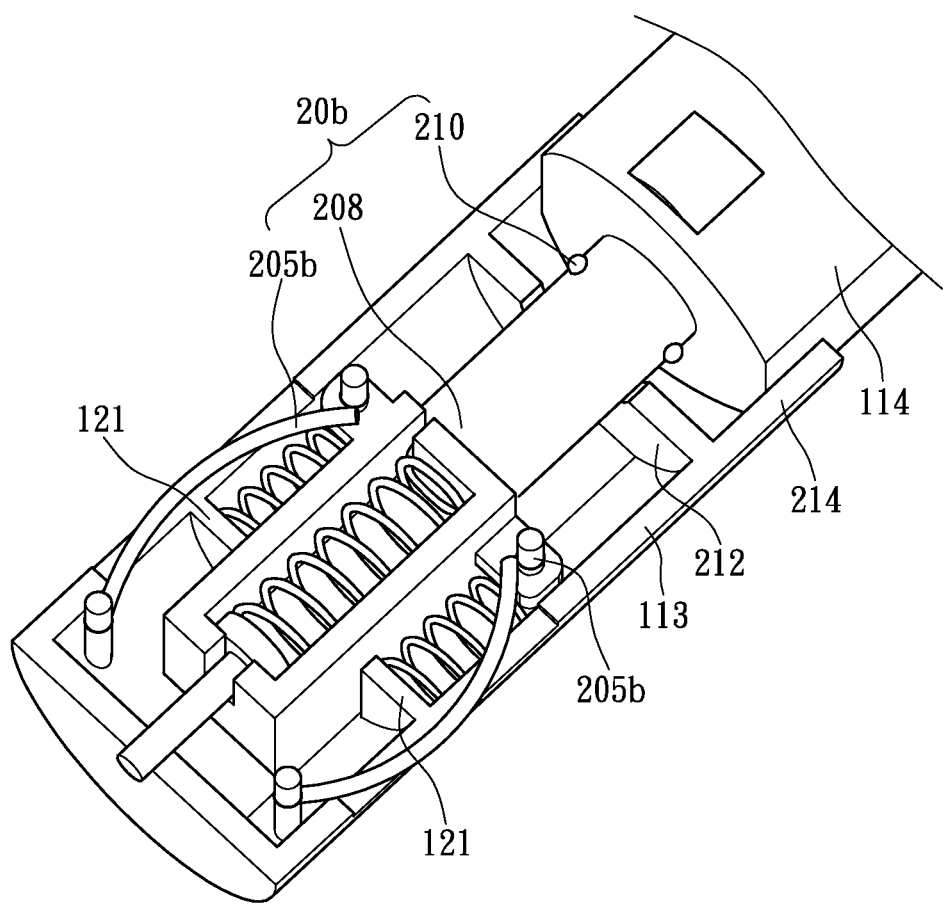
FIG. 5C is an inner structural diagram of the car charger when the conduction sections are collected within the car charger according to another embodiment of the present invention.

On the other hand, when the user wants to collect the anode conduction section 13b into the car charger 10b, the third shell 113 may be shifted for covering the anode conduction section 13b and the cathode conduction section 15b. As shown in FIG. 5C, in this situation, the cross point 210 is not blocked by the cross slice 212, so the third shell 113 is pushes slightly outward from the fourth shell 114 by the elastic component 213 for covering and collecting the anode conduction section 13b and cathode conduction section 15b into the car charger 10b. In other words, when the cross point 210 is not blocked by the cross board 212 and are pulled outside the shell 11, the anode conduction section 13b is retracted in the shell 11, and the cathode conduction section 15b is stretched by the elastic component 213 and received in the shell 11. Additionally, the third shell may further includes an extended shell 214 for covering the connection component 208 which may be revealed when the third shell 113 is shifted slightly outward from the fourth shell 114.

In another embodiment, the rotation hinge 206 may also be designed for being rotated along a radial direction. Thus, because of the radial-directed rotation hinge 206, the anode conduction section 13b and cathode conduction section 15b may be selectively collected by folding the third shell 113 with the fourth shell 114.

Figure 6:
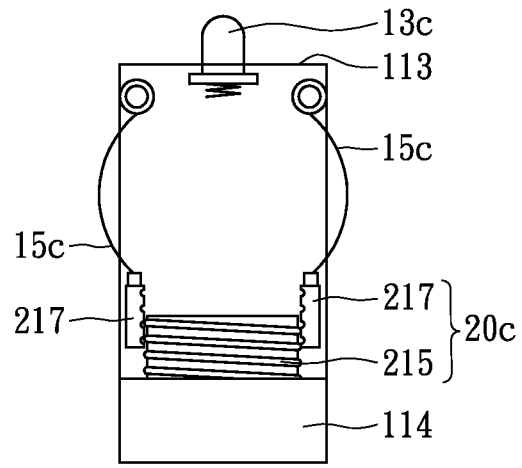
FIG. 6 is a structural diagram of a car charger when the conduction sections are not collected according to still another embodiment of the present invention.
Figure 7:
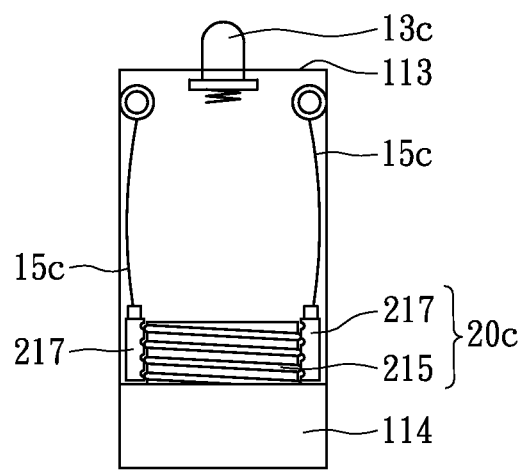
FIG. 7 is a structural diagram of the car charger when the conduction sections are collected according to the embodiment of the present invention.

Please refer to FIGS. 6 and 7, which are schematic diagrams of the car charger 10c according to still another embodiment of the present invention. The car charger 10c has an anode conduction section 13c, cathode conduction sections 15c, charge circuit (not shown), and an operation section 20c. In this embodiment, the operation section 20c includes a rotation component 215 and a slide piece 217. The rotation component 215 is connected to the fourth shell 114 of the car charger 10c, and the surface of the rotation component 215 has at least one spiral thread. The slide piece 217 is connected to the cathode conduction sections 15c, and has at least one dimpled grain corresponding to the spiral thread. When the user rotates the fourth shell 114 of the car charger 10c, the rotation component 215 is rotated along with the fourth shell 114. With the combination of the spiral threads and the dimpled grains, the slide piece 217 is moved forward and backward, so as to stretch or bend the cathode conduction sections 15c for collecting the sections 15c within the car charger 10c.

Additionally, for improving the convenience of carrying the car charger, the shape of the car charger may be designed as a thin four-corner pillar. The thin appearance of the car charger may reduce the volume and weight of the car charger. Certainly, the shape of the car charger may be designed in any shape by any manner.

As described above, by setting up operation section with the car charger, the anode and cathode conduction sections may be collected within the car charger. Therefore, the practical value and the convenience of carrying the car charger may be improved according to the present invention.

Some modifications of these examples, as well as other possibilities will, on reading or having read this description, or having comprehended these examples, will occur to those skilled in the art. Such modifications and variations are comprehended within this invention as described here and claimed below. The description above illustrates only a relative few specific embodiments and examples of the invention. The invention, indeed, does include various modifications and variations made to the structures and operations described herein, which still fall within the scope of the invention as defined in the following claims.

What is claimed is:

1. An automotive battery plug with retractable conduction sections, comprising:
   a shell including a container space, having a front end and a rear end;
   a carrying base, slidably received in the container space of the shell, having a front end and a rear end, the carrying base having a pushing slice fixed to the rear end thereof;
   a rotating switch, rotatably mounted to the rear end of the shell to push the pushing slice of the carrying base between a forward position and a backward position;
   an anode conduction section disposed in the carrying base, and extended outside the front end of the carrying base;
   a cathode conduction section stretchably disposed in the shell and besides the carrying base, and having two ends fixed to the front end of the shell and the rear end of the carrying base respectively; and
   an elastic component disposed in the shell and beside the carrying base for pushing the carrying base far away the front end of the shell; and
   wherein corresponding to the forward position of the carrying base, the anode conduction section is protruded outside the front end of the shell, and the cathode conduction section is protruded outside the shell;
   wherein corresponding to the backward position of the carrying base, the anode conduction section is retracted in the shell, and simultaneously the cathode conduction section is stretched by the elastic component inside the shell.

2. The automotive battery plug with retractable conduction sections as in claim 1, wherein the shell is formed with at least one slide track (115) on an inner surface thereof, wherein the carrying base further includes at least one slide slice (207) corresponding to the slide track (115) of the shell, for guiding the carrying base to move in a predetermined direction.

3. The automotive battery plug with retractable conduction sections as in claim 1, wherein the rotating switch includes a rotation hinge rotatably mounted on the rear end of the shell, and a rotation positioning component connected to the rotation hinge and extended into the shell, wherein the pushing slice has an inclined plane to contact the rotation positioning component.

4. The automotive battery plug with retractable conduction sections as in claim 1, wherein the carrying base having a support section formed at one side of the rear end of the carrying base, and the support section is connected to one end of the cathode conduction section.

5. An automotive battery plug with retractable conduction sections, comprising:
   a shell including a container space, having a front end and a rear end;
   a carrying base, movably received in the container space of the shell, having a front end and a rear end;
   an anode conduction section disposed in the shell;
   a cathode conduction section stretchably disposed in the shell, and having one end fixed to the front end of the shell;
   a rotation component rotatably mounted to the rear end of the shell, in which a surface of the rotation component has at least one spiral thread; and
   a slide piece, movably disposed in the shell, connected with the other end of the cathode conduction section, wherein the slide piece has at least one dimpled grain engaged with the spiral thread of the rotation component;
   wherein the rotation component rotates for moving the slide piece rearward to stretch the cathode conduction section within the container space.

6. An automotive battery plug with retractable conduction sections, comprising:
   a shell including a container space, having a front end and a rear end
   a carrying base, slidably received in the container space of the shell, having a front end and a rear end, the carrying base having a cross board formed at the rear end;
   an anode conduction section disposed in the carrying base, and extended outside the front end of the carrying base;
   a cathode conduction section stretchably disposed in the shell and besides the carrying base, and having two ends fixed to the front end of the shell and the rear end of the carrying base respectively;
   an elastic component disposed in the shell and beside the carrying base for pushing the carrying base far away the front end of the shell; and
   a rotating switch, rotatably mounted to the cross board of the shell, having a connection component extended into the container space of the shell and contacted with the rear end of the carrying base, the rotating switch having at least one cross point formed on the connection component
   whereby when the cross point is selectively blocked by the cross board in the shell, the anode conduction section is protruded outside the front end of the shell, and the cathode conduction section is protruded outside the shell;
   whereby when the cross point is not blocked by the cross board outside the shell, the anode conduction section is retracted in the shell, and simultaneously the cathode conduction section is stretched by the elastic component inside the shell.

7. The car charger as in claim 6, wherein the shell is formed with at least one slide track on an inner surface thereof, wherein the carrying base further includes at least one slide slice corresponding to the slide track of the shell, for guiding the carrying base to move in a predetermined direction.

8. The car charger as in claim 6, wherein the rotating switch includes a rotation hinge rotatably mounted on the rear end of the shell, and a rotation positioning component connected to the rotation hinge and extended into the shell, wherein the pushing slice has an inclined plane to contact the rotation positioning component.

9. The car charger as in claim 6, wherein the carrying base having a support section formed at one side of the rear end of the carrying base, and the support section is connected to one end of the cathode conduction section.

* * * * *